(12) United States Patent
King (10) Patent No.: US 12,104,892 B2
(45) Date of Patent: Oct. 1, 2024

(54) SYSTEM AND METHOD FOR CREATING A CUSTOM PROTECTIVE EQUIPMENT ITEM

(71) Applicant: Steven King, Powell, OH (US)

(72) Inventor: Steven King, Powell, OH (US)

(*) Notice: Subject to any disclaimer, the term of this patent is extended or adjusted under 35 U.S.C. 154(b) by 0 days.

(21) Appl. No.: 18/211,024

(22) Filed: Jun. 16, 2023

(65) Prior Publication Data

US 2023/0341223 A1 Oct. 26, 2023

Related U.S. Application Data

(63) Continuation of application No. 14/874,101, filed on Oct. 2, 2015, now abandoned.

(51) Int. Cl.
*G01B 11/24* (2006.01)
*A42C 2/00* (2006.01)
*G01B 11/14* (2006.01)

(52) U.S. Cl.
CPC .............. *G01B 11/24* (2013.01); *A42C 2/007* (2013.01); *G01B 11/14* (2013.01)

(58) Field of Classification Search
CPC .......... G01B 11/24; G01B 11/14; A42C 2/007
See application file for complete search history.

(56) References Cited

U.S. PATENT DOCUMENTS

| 4,345,338 | A | 8/1982 | Frieder, Jr. et al. |
| 5,405,312 | A | 4/1995 | Jacobs |
| 6,178,556 | B1 | 1/2001 | Foreman et al. |
| 7,003,803 | B1 | 2/2006 | Lyden |
| 7,882,839 | B2 | 2/2011 | Ambis, Jr. |
| 10,780,338 | B1 | 9/2020 | Bologna et al. |
| 10,948,898 | B1 | 3/2021 | Pietrzak et al. |
| 11,525,906 | B2* | 12/2022 | Kadambi ............... G06V 20/64 |
| 11,625,901 | B2* | 4/2023 | Littlefield .............. B33Y 50/02 |
| | | | 425/135 |
| 11,712,615 | B2* | 8/2023 | Bologna ................ A42C 2/007 |
| | | | 2/455 |
| 11,822,312 | B2* | 11/2023 | Richardson .......... G06V 40/103 |
| 2003/0208302 | A1 | 11/2003 | Lemelson et al. |
| 2004/0204904 | A1 | 10/2004 | Ebisawa |
| 2005/0050617 | A1 | 3/2005 | Moore, III et al. |
| 2006/0101559 | A1 | 5/2006 | Moore, III et al. |
| 2006/0278501 | A1 | 12/2006 | Sweazy |

(Continued)

OTHER PUBLICATIONS

Halterman, 3DPrint.com, Gritt 3D Creating Custome 3D Printed Sports Mouthguards, www.http://3dprint.com/46434/gritt-3d-3d-printed-mouthguards/, Feb. 23, 2015.

(Continued)

*Primary Examiner* — Tajash D Patel
(74) *Attorney, Agent, or Firm* — Standley Law Group LLP; Jeffrey S. Standley; Adam J. Smith (57) ABSTRACT

The present invention is a system and method for creating a customized protective equipment item having improved fit. A measuring device takes measurements of a person. The measurements are sent to a computer, which has software for translating the measurements into a custom selection of standard sized components used to assemble the custom protective equipment item. An assembly process builds the completed protective equipment item which is customized to the wearer's size requirements.

18 Claims, 12 Drawing Sheets

(56) References Cited

U.S. PATENT DOCUMENTS

| | | |
|---|---|---|
| 2007/0245468 A1 | 10/2007 | Butler |
| 2009/0010285 A1* | 1/2009 | Dubois ................ G10K 15/046 356/614 |
| 2009/0028679 A1 | 1/2009 | Smith |
| 2011/0056004 A1 | 3/2011 | Landi |
| 2011/0078888 A1 | 4/2011 | Horkey |
| 2011/0203038 A1 | 8/2011 | Jones, Jr. |
| 2013/0211774 A1 | 8/2013 | Bentley et al. |
| 2014/0201889 A1 | 7/2014 | Pietrzak et al. |
| 2015/0157081 A1 | 6/2015 | Hyman |
| 2022/0400806 A1* | 12/2022 | Pietrzak ............. G05B 19/4099 |
| 2024/0180285 A1* | 6/2024 | Pietrzak ................... A41H 3/04 |

OTHER PUBLICATIONS

Cadlete, http://www.cadlete.com/#evolvenow, visited Jul. 10, 2015.

Hiscott, Mashable, 3D—Scanned Olympians Wear Uniforms Suited for Superheroes, http://mashable.com/2014/01/29/sochi-hockey-equipment/, Jan. 29, 2014.

Jabil, Gold Standard Protective Gear at the Winter Olympic Games, http://www.jabil.com/blog/gold-standard-protective-gear-at-the-winter-olympic-games.html, Feb. 14, 2014.

Decision on Appeal, United States Patent and Trademark Office Before The Patent And Appeal Board, Appeal 2020-000051, May 14, 2021, 12 pages.

* cited by examiner

| Football Helmet Sizing Chart | | | | | |
|---|---|---|---|---|---|
| Adult | | | | | |
| Size | S | M | L | XL | XXL |
| Hat Size | 6 1/8 - 6 3/4 | 6 1/2 - 7 | 7 - 7 1/2 | 7 1/4 - 7 1/2 | 7 1/2 - 7 3/4 |
| Circumference | 19 5/8 - 21 1/4 | 20 1/8 - 22 3/8 | 21 5/8 - 23 1/4 | 23 1/8 - 25 1/2 | 24 1/2 - 26 1/2 |
| Youth | | | | | |
| Size | S | M | L | XL | XXL |
| Hat Size | 6 3/8 - 6 5/8 | 6 5/8 - 6 7/8 | 6 7/8 - 7 1/8 | 7 1/8 - 7 3/8 | 7 3/8 - 7 1/2 |
| Circumference | 20 1/8 - 20 1/2 | 20 5/8 - 21 1/4 | 21 3/8 - 22 | 22 1/8 - 22 3/4 | 22 7/8 - 23 1/2 |

Football Helmet Size Chart
Image 2 of 2 (play slideshow)

CLOSE ✕

Prior art – Source: http://www.dunhamssports.com/resource-center/football-helmet-size-chart/

SYSTEM AND METHOD FOR CREATING A CUSTOM PROTECTIVE EQUIPMENT ITEM

CROSS-REFERENCE TO RELATED APPLICATION

This application is a continuation of U.S. application Ser. No. 14/874,101 filed Oct. 2, 2015, the disclosures of which are hereby incorporated by reference as if fully restated.

TECHNICAL FIELD

Exemplary embodiments of the present invention relate generally to protective equipment, namely customized protective equipment.

BACKGROUND AND SUMMARY OF THE INVENTION

Protective equipment has long been used to guard the body against injury from dangerous activities. Police, firefighters, military personnel, and workers use protective equipment to guard them from injuries on the job. Likewise, athletes and other users employ protective equipment to guard themselves from injuries while playing sports or engaging in other recreational pursuits, including but not limited to, motorcyclists, bicyclists, skateboarders, rollerblades, skiers, rock climbers, and the like.

Protective equipment has long come in a series of standard sizes, such as XS, S, M, L, XL, and XXL. While users have generally been able to select the most comfortable or best fitting from these options, depending on availability, even the most comfortable or best fitting option may be ill suited for the person's body. The consequences of ill fitting protective equipment can be severe. Poorly fitted protective equipment can lead to equipment failure and under-protection for the wearer that can result in many kinds of injury. Further, poorly fitted equipment can be uncomfortable. Uncomfortable equipment by itself is undesirable. Further, uncomfortable equipment is less likely to be worn properly by a user, leaving them vulnerable to injury. For example, individuals who may have body physiques that fall outside the averages that protective equipment are generally built around are likely to find that their protective equipment does not fit well.[1]

[1] http://www.businessinsurance.com/article/20150104/NEWS08/301049992/ill-fitting-gear-poses-problem-for-women-working-safety-sensitive?tags=%7C92%7C304. ("Since more women are working in industries that require employees to wear personal protective equipment has spurred a larger discussion about ill-fitting gear, experts say.")

Properly fitting protective equipment is difficult. Standard sizes often force the person to select a "least common denominator" option. That is, the user will likely be forced to select the standard size which fits their largest applicable dimension. For example without limitation, if the user had temple-to-temple size that matched a large (L) helmet, but a forehead to back-of-head measurement that matched a medium (M) helmet, the user would likely be forced to choose the large size to accommodate the largest of the two dimensions. This selection, however, would leave the user with a gap between his forehead and the inner surface of the helmet and the back of his head and the inner surface of the helmet. In a collision, this could critically reduce the effectiveness of the helmet. A head injury is far more likely when a gap exists between the user's head and the inner surface of the helmet.[2]

[2] http://michaelibermd.com/news/role-football-helmets-concussion-prevention/ ("[S]tudies have shown that a properly-fitted helmet could potentially reduce the risk of a concussion by about 20% ... the helmet should fit snugly, and there should be no space between the helmet's pads and the wearer's head.")

As another example, without limitation, an individual may have one shoulder that rests slightly higher than the other. This may necessitate additional padding under the lower-resting shoulder such that the shoulder pad fits comfortably and evenly on the user. This may prevent the shoulder pad from otherwise unevenly distributing the forces of a collision across one, instead of both, shoulders.

Therefore, it would be desirable to provide a system and method for creating customized fit protective equipment. Such a system and method would provide accurate fitting, comfortable equipment which will lessen the risk of injury.

Exemplary embodiments of the present invention are directed to a system and method to provide customized protective equipment. Exemplary embodiments include a system and method whereby a user's body, or individual body parts, is scanned by a measurement system, such as a three-dimensional ("3D") imaging system. The data is then stored and analyzed to extract various dimensions needed to create the protective equipment item. The dimensions may be used to create a completely custom piece of protective equipment. Alternatively, the dimensions may be processed through an algorithm to select a series of components of various standard sizes that are assembled to create the custom protective equipment item of the present invention. To help illustrate, but not to serve as a limitation, an extra-large set of outer shoulder pads may be selected and assembled with an L size inner right shoulder pad insert and an M inner left shoulder pad insert to best fit an athlete with uneven or different size shoulders.

In other situations, a user may have a temporary condition that results in a need for an irregularly shaped protective equipment item. For example, but without limitation, to protect a contusion or to accommodate a brace, support, or other medical device. The present invention can take such a condition into account in creating a custom fit pad.

Once the proper sizes are selected, the results may be transmitted to a manufacture. A computer at the manufacturer may receive the instructions and create assembly instructions to create the custom fit protective equipment item. In other exemplary embodiments of the present invention, the measurements may be sent to the manufacturer, where they are then downloaded and processed through the algorithm and used to create a completely custom piece of protective equipment. Robots or other automated means of assembly may be utilized to create custom protective equipment item. The result is a better-fitting protective equipment item that is comfortable and reduces injuries.

The applications of this invention are numerous and will be apparent to those skilled in the art. For example, but not to serve as a limitation, the present invention may be used to create customized athletic protective equipment. In other exemplary applications, the present invention may be used to create protective equipment for the workplace. In still other exemplary applications, the present invention may be used to create custom protective equipment for recreational pursuits. Within these applications, without limitation, the present invention may be used to create custom protective equipment for any body part.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein.

DETAILED DESCRIPTION OF EXEMPLARY EMBODIMENT(S)

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

Figure 1:
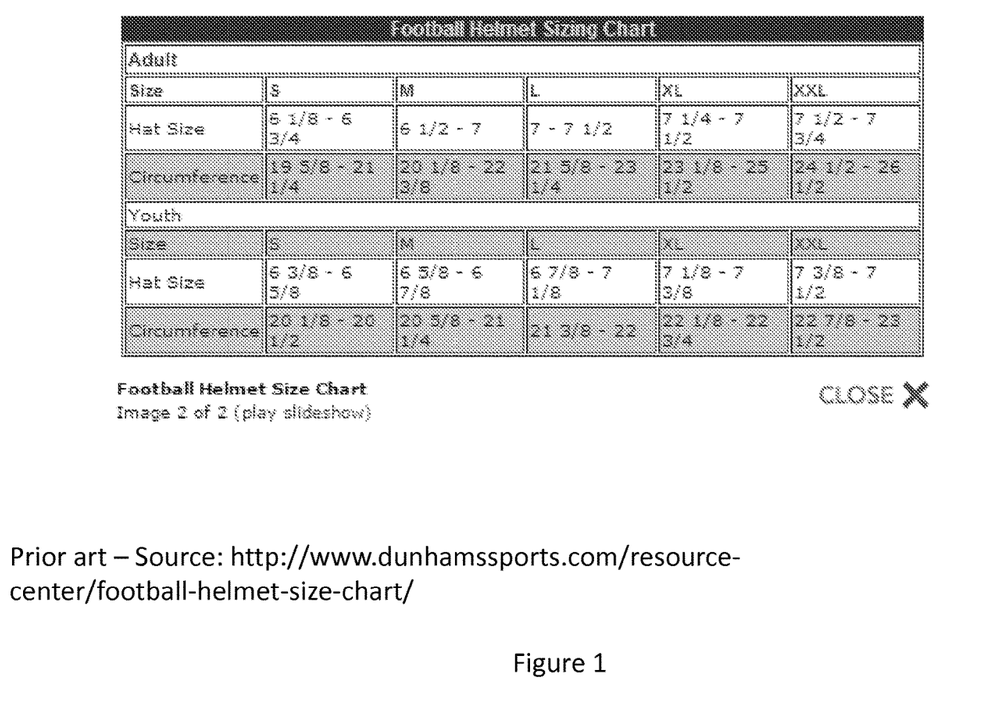
FIG. 1 is a prior art sizing chart guide for football helmets.

FIG. 1 is a prior art sizing chart for football helmets.[3] This demonstrates how prior art protective equipment items, such as football helmets, are generally sized. While this example discusses football helmets, as previously mentioned, this is merely exemplary and not intended to the limiting. Any type of protective equipment for any application is contemplated. A single measurement, such as head circumference is used to give a size, generally XS, S, M, L, XL, and XXL. As previously discussed, this forces users to select the smallest size that still fits their largest dimension. For example, without limitation, if a person has a larger forehead but a smaller jaw structure, they may have to choose a larger size helmet that leaves extra space in the jaw and cheek area, exposing them to injury. Further, the user may be less likely to wear such an ill-fitting helmet properly as it may shift frequently during use.

[3] http://www.dunhamssports.com/resource-center/football-helmet-size-chart/

Figure 2:
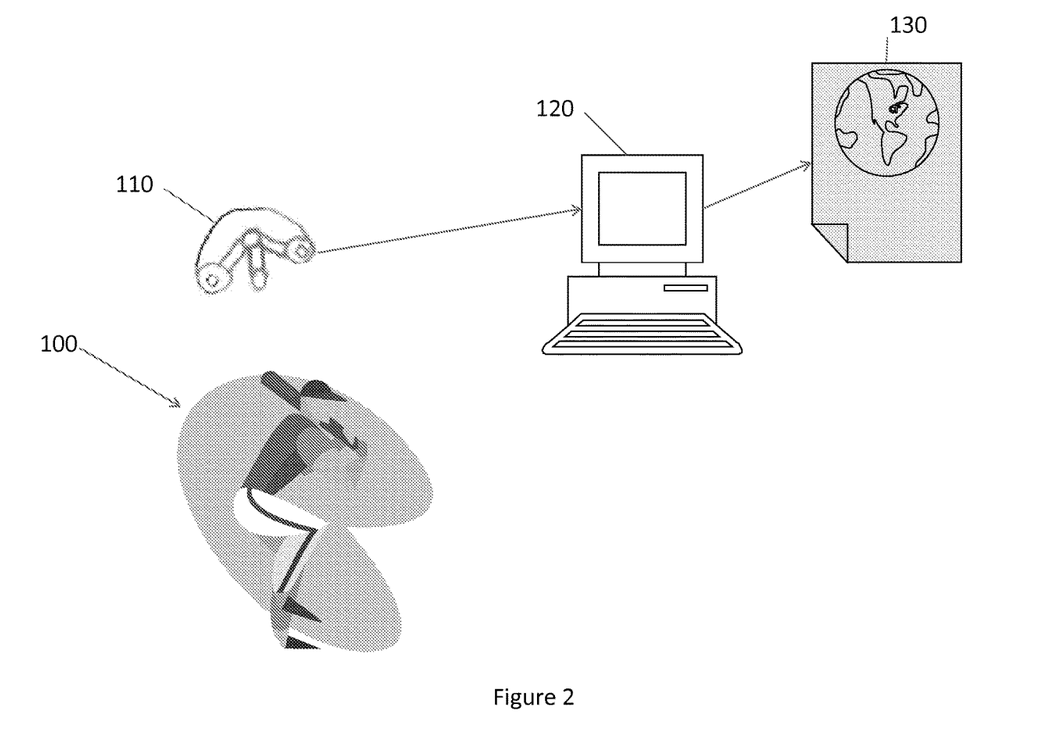
FIG. 2 illustrates an exemplary measurement process in accordance with the present invention.

FIG. 2 illustrates an exemplary measurement process in accordance with the present invention. A measuring device 110 is used to measure the contours and distances of a person's 100 body or body parts. In exemplary embodiment of the present invention, measurements are taken of a person 100 by use of a 3D scanner. Any other measuring device, including but not limited to, a tape measure, calipers, and the like are contemplated.

As will be described in greater detail in subsequent figures, the results of the measuring device 110 are utilized to create a custom piece of protective equipment 160 for the person 100. The custom protective equipment 160 may include athletic protective equipment for athletes, or other protective equipment for recreational or professional users. For example, without limitation, this may include athletic equipment (e.g., football pads, lacrosse pads, hockey pads, soccer pads) or other professional or recreational personal protective equipment (e.g., knee pads, back braces, ankle braces, elbow pads, helmets).

For example without limitation, if taking the measurements of the user's head to create a custom helmet, measurements such as temple to temple, forehead circumference, forehead to back-of-skull, ear to ear, cheekbone to cheekbone, and chin to top-of-head, and the like, may be taken. Specific measurements may be taken as required and any such measurements are contemplated. These measurements may be recorded in a computer 120. Other storage devices, including but not limited to hand written documentation, are also contemplated. As will be explained in greater detail in subsequent figures, these results may be processed by the computer 120 to generate a set of results. These results may be used to create a custom protective equipment item 160. Optionally, these results may be uploaded to the internet 130.

Figure 3:
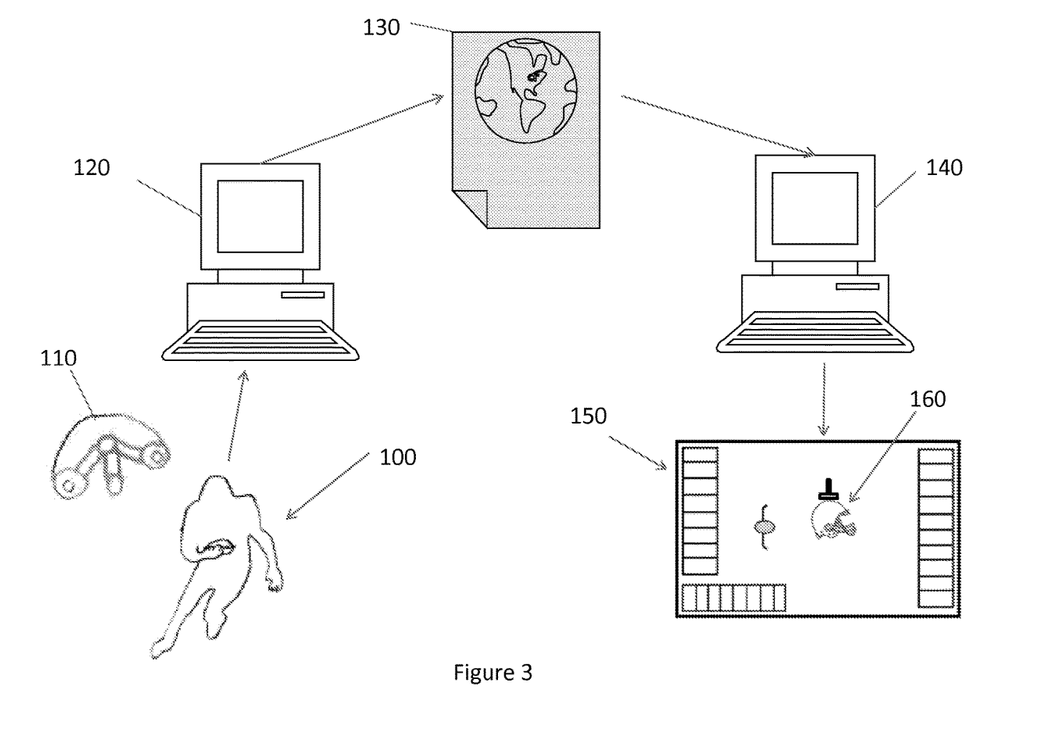
FIG. 3 illustrates an exemplary customization process, including the exemplary measurement process shown in FIG. 2.

FIG. 3 illustrates an exemplary customization process, which includes the exemplary measurement process of FIG. 2. The results stored in the computer 120 may be transmitted to a second computer 140, which in exemplary embodiments of the present inventions is located at a manufacturer. In exemplary embodiments of the present invention, this transmission is accomplished via the internet 130. However, any other transmission means are contemplated, including storing the information on a disk, flash drive, portable hard drive, cloud storage, wired connection, intranet, Ethernet, print out, hand written documentation, and the like. The results may be used by the second computer 140 to generate instructions that control a manufacturing process 150 to create the custom protective equipment item 160.

Figure 3A:
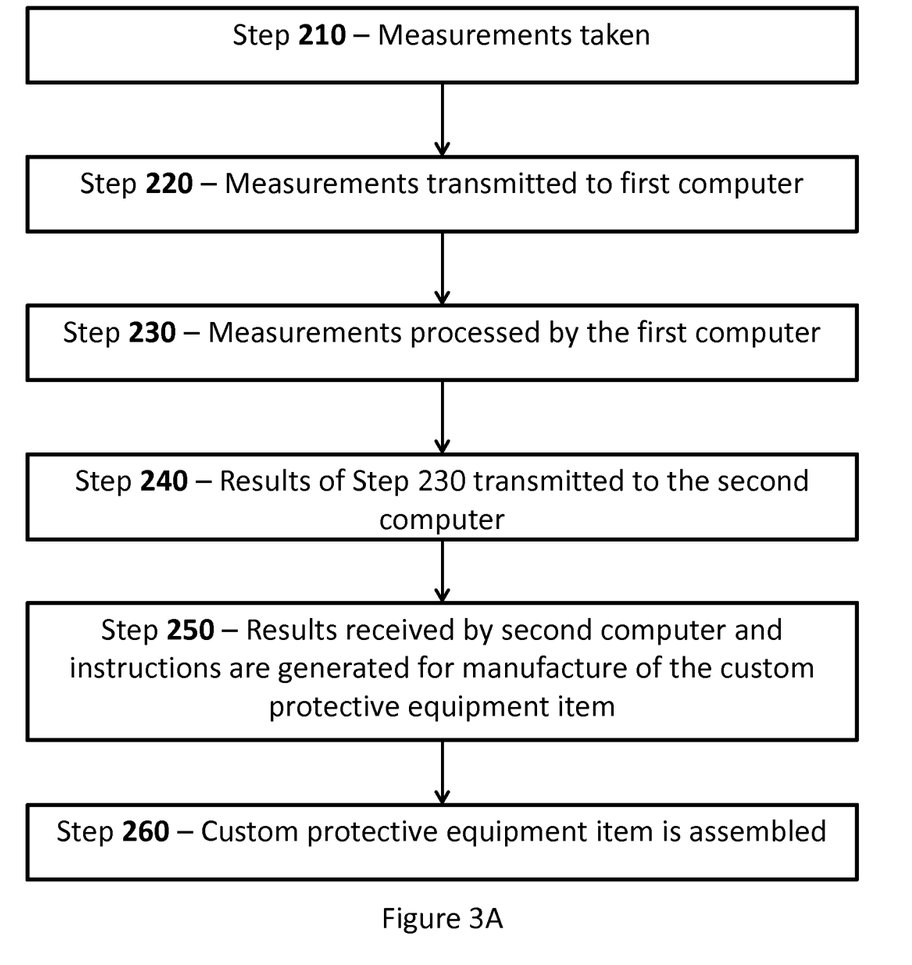
FIG. 3A is a flow chart describing the steps illustrated in FIG. 3.

FIG. 3A is a flow chart describing the steps illustrated in FIG. 3. In step 210, measurements may be taken of the person 100, such as by use of the measuring device 110 as discussed in FIG. 2 and FIG. 3. In step 220, the measurements may be sent automatically to the first computer 120. This transmission may be accomplished by a wired or wireless connection. Alternatively, the measurement may be entered into the computer manually.

In step 230, the first computer 120 may process the measurements by use of an algorithm to generate results used to create an entirely custom protective equipment item 160 for the user 100. In other exemplary embodiments of the present invention, the first computer 120 may process the measurements by use of an algorithm to generate a selection of the best fitting combination of standard size components (e.g., individual pads within an overall protective equipment article such as a helmet) to create the custom protective equipment item 160. For example, without limitation, the results may include a selection of an outer shell 310 and a series of inner pads 320, 330, 340, 350, and 360. As will be explained in greater detail in subsequent figures, these selections may include size, style, material, orientation, placement location, thickness, shape, and the like of components that assemble to create the protective equipment item 160. In other exemplary embodiments of the present invention, the algorithm may be processed on the second computer 140 or any other computer.

In step 240 the results of step 230 may be transmitted to the second computer 140. This transmission may be accomplished via the internet 130, cloud storage, physical transfer, or the like. The second computer 140 may be located at a manufacturer of the custom protective equipment item 160, though any location is contemplated. In step 250 the second computer 140 may generate instructions for the assembly of the protective equipment item 160, which occurs at step 260. As will be discussed in greater detail in subsequent figures the assembly may be done manually or by an automated system. Any necessary instructions to control such an assembly process are contemplated, including but not limited to, computer instructions to control a machine or print out instructions to direct a human worker.

Figure 4:
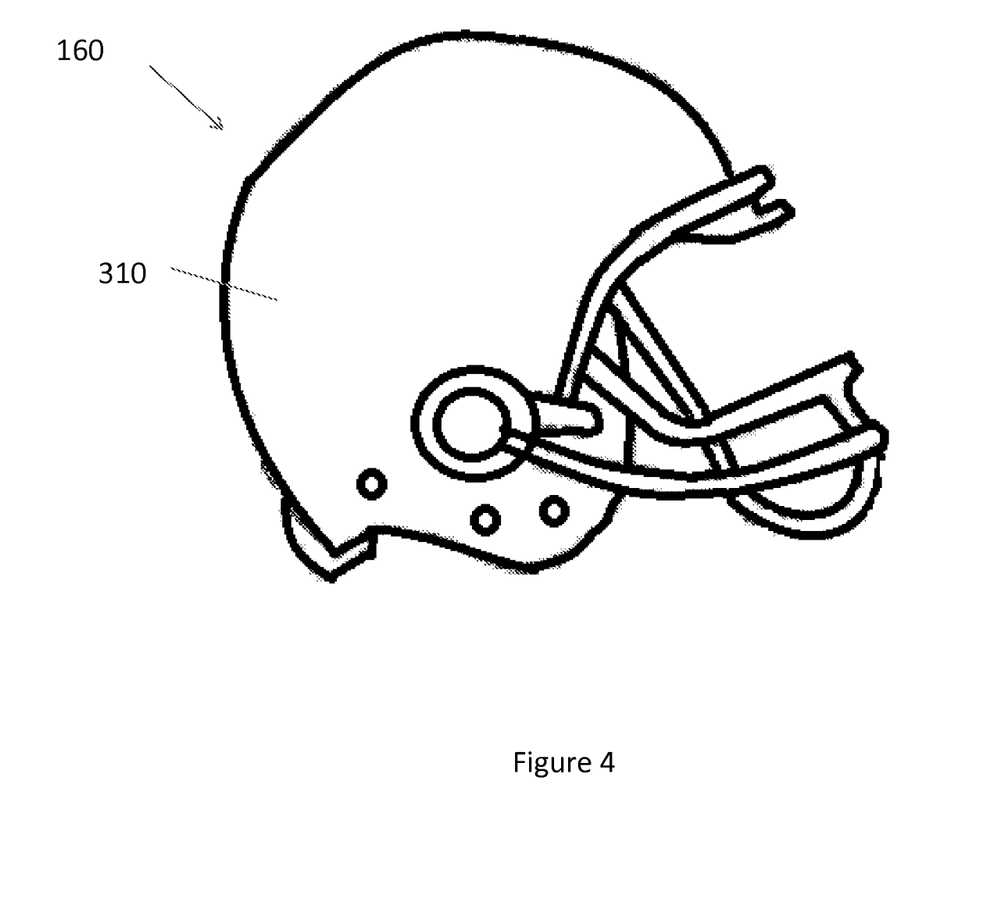
FIG. 4 is a side view of an exemplary protective equipment item in the form of a football helmet, in accordance with an exemplary embodiment of the present invention.
Figure 5:
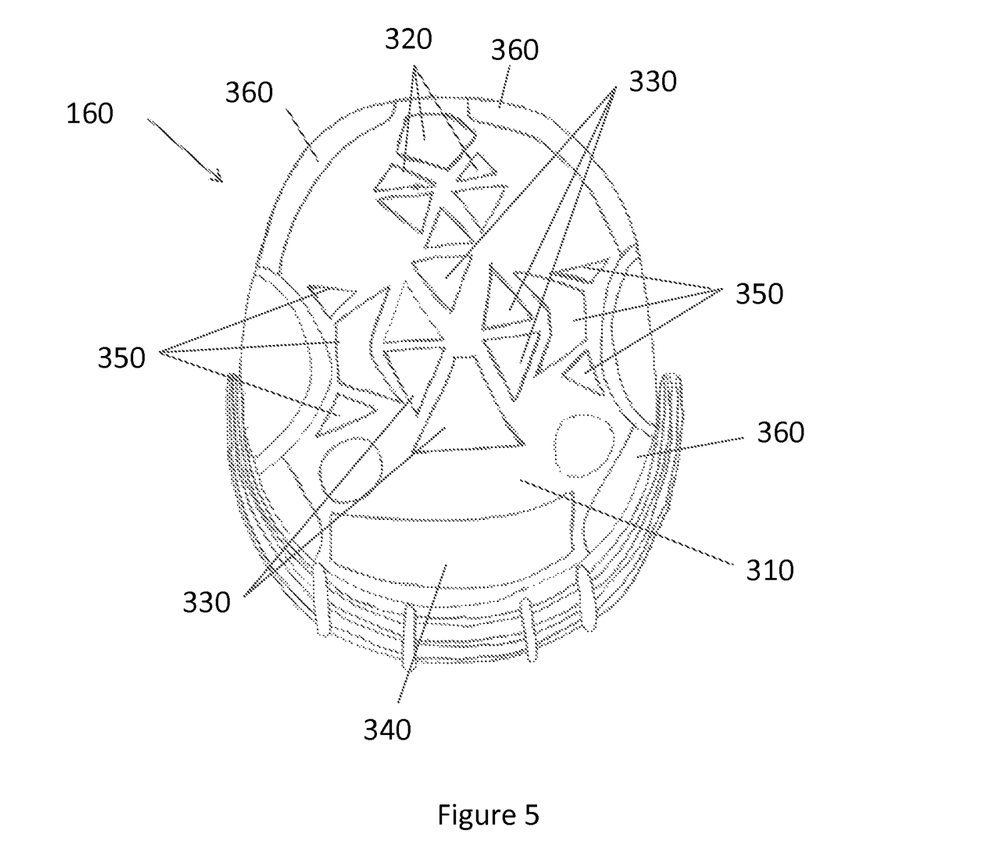
FIG. 5 is a bottom view of the football helmet of FIG. 4 illustrating an exemplary inner pad arrangement.
Figure 6:
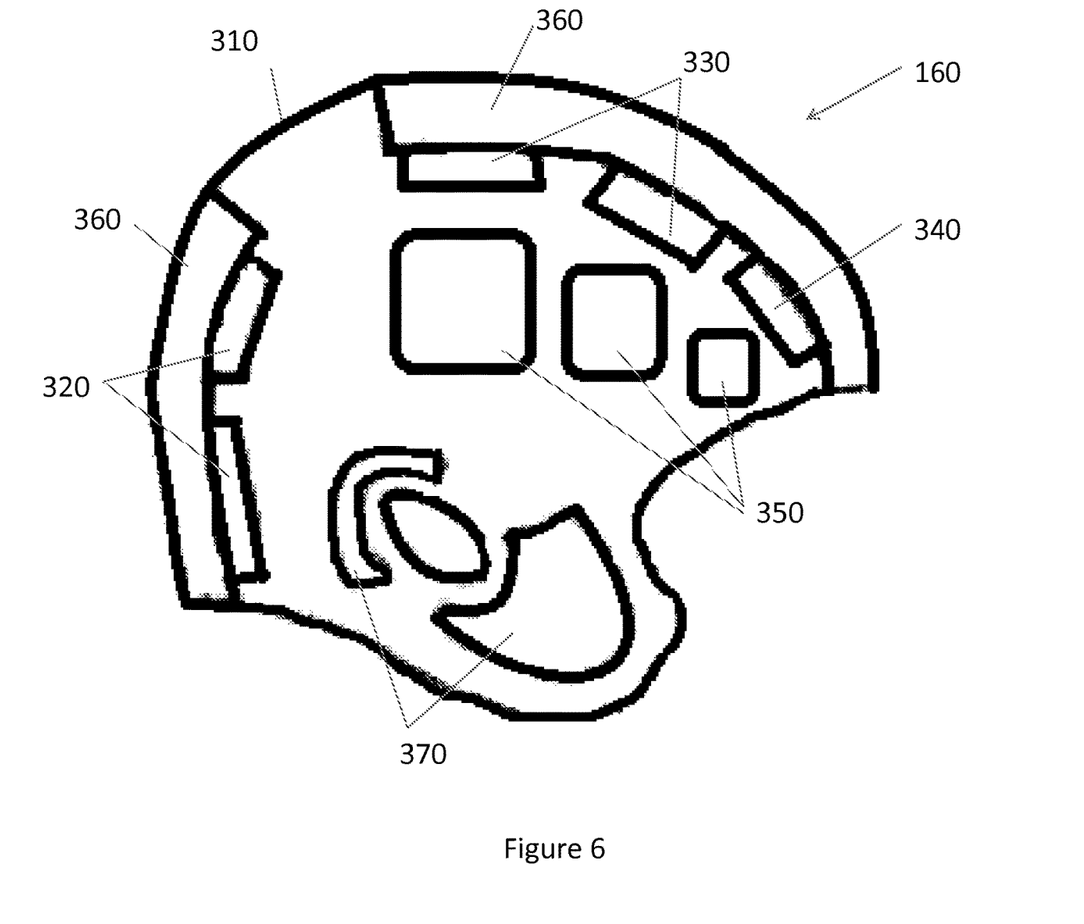
FIG. 6 is a side cross-sectional view of the football helmet of FIG. 4 illustrating another exemplary inner pad arrangement.

FIG. 4 though FIG. 6 illustrate a protective equipment item 160 in the form of a football helmet in accordance with an exemplary embodiment of the present invention. It is notable that the present helmet embodiment is merely exemplary, and the present invention applies to all kinds of protective equipment items. This includes, but is not limited to, chest pads, arm pads, shoulder pads, elbow pads, wrist guards, gloves, rib pads, hip pads, thigh pads, knee pads, shin pads, ankle pads, shoe inserts, foot pads, the like, and combinations thereof. This also includes, but is not limited to, pads adopted to protect from injury related to any athletic, recreational, or professional endeavor. For example, without limitation, the exemplary helmet could be a construction helmet, firefighter helmet, or a motorcycle helmet. As a further example, without limitation, the protective equipment may be a set of wrist guards adapted to be used for a recreational snowboarding.

As best illustrated in FIG. 5 and FIG. 6, the exemplary helmet comprises a rigid outer shell 310 and a series of pads 320, 330, 340, 350, 360, and 370 that line the interior. Said pads 320, 330, 340, 350, 360, and 370 may be of various thicknesses, sizes, orientations, materials, and styles. Said pads 320, 330, 340, 350, 360, and 370 may be configured to fit within the more rigid outer shell 310 and are used to provide shock protection as well as a secure fit. The distance between the pads and the user is critical to providing injury protection as well as a comfortable fit.

In the present embodiment of a helmet, the pads 320, 330, 340, 350, 360, and 370 may include top pads such as pads 330, forehead pads such as pads 340, rear pads such as pads 320, and side pads such as pads 350 and 370. These pads 320, 330, 340, 350, 360, and 370 are merely intended to serve as an illustration and are not intended to be limiting. As previously discussed, the present invention may be used with protective equipment for many different activities, and thus the number, size, orientation, location, and type of pads utilized may be different for each activity. Additionally, in exemplary embodiments of the present invention, multiple layers of pads, such as pads 360 and 320, may be used between the outer shell 310 and the user 100. For example, within the helmet, a medium size outer shell may be used with a large forehead pad, medium ear pads, and small pads for the remainder.

Figure 7A:
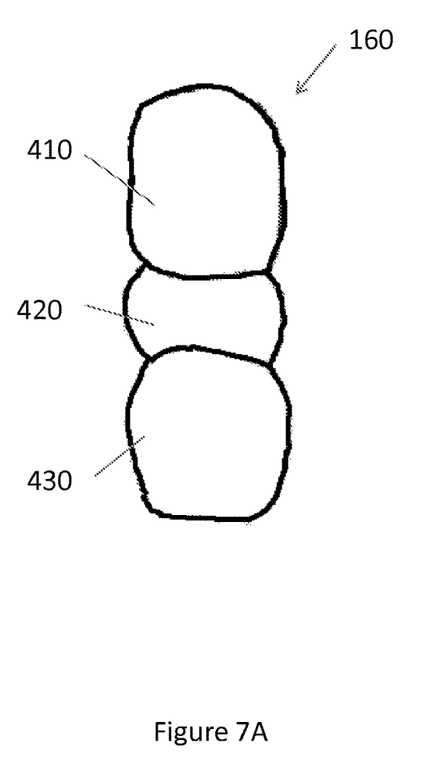
FIG. 7A illustrates a front view of an exemplary protective equipment item in the form of a lacrosse elbow pad, in accordance with an exemplary embodiment of the present invention.
Figure 7B:
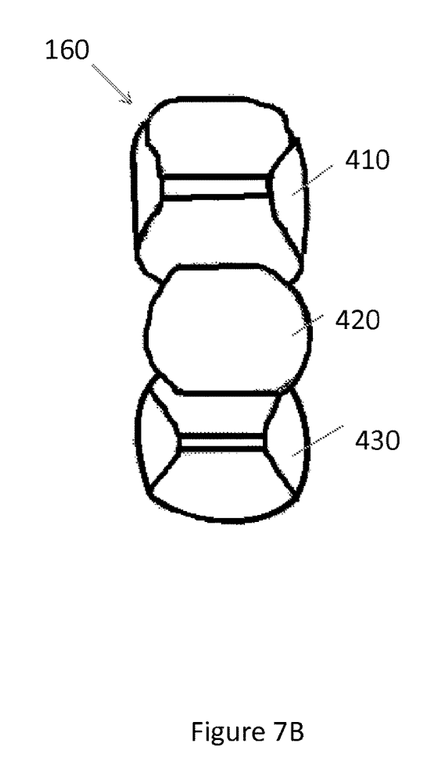
FIG. 7B is a rear view of the exemplary lacrosse elbow pad of FIG. 7A.

As an additional example, the custom protective equipment item 160 may be a custom elbow pad for lacrosse, such as illustrated in FIG. 7A and FIG. 7B. To create such an item, a scan of an athlete's arm may be taken. Measurements such as wrist to elbow, elbow circumference, forearm circumference, elbow to bicep, and bicep circumference may be taken. A customized combination may be utilized to fit the upper pad 410, middle pad 420, and lower pad 430, to the athlete's arm. For example, without limitation, a large upper pad 410, may be utilized with a medium middle pad 420, and a small lower pad 430.

In other exemplary embodiments of the present invention, the custom protective equipment item 160 and its individual pieces may be entirely custom created to fit the user's needs, preferences, and body contour. In still other exemplary embodiments of the present invention, measurements may be taken to fit a pad to a temporary condition. For example, but without limitation, if the user is injured with a sever contusion, the custom protective equipment item 160 may be measured to fit over the swollen area such as to protect the area without placing pressure on it. As a further example, if the user has a medical device, such as a pacemaker, cochlear implant, or an insulin pump, the custom protective equipment item 160 may be measured to fit over the device so as to protect the area without placing pressure on it.

Figure 8:
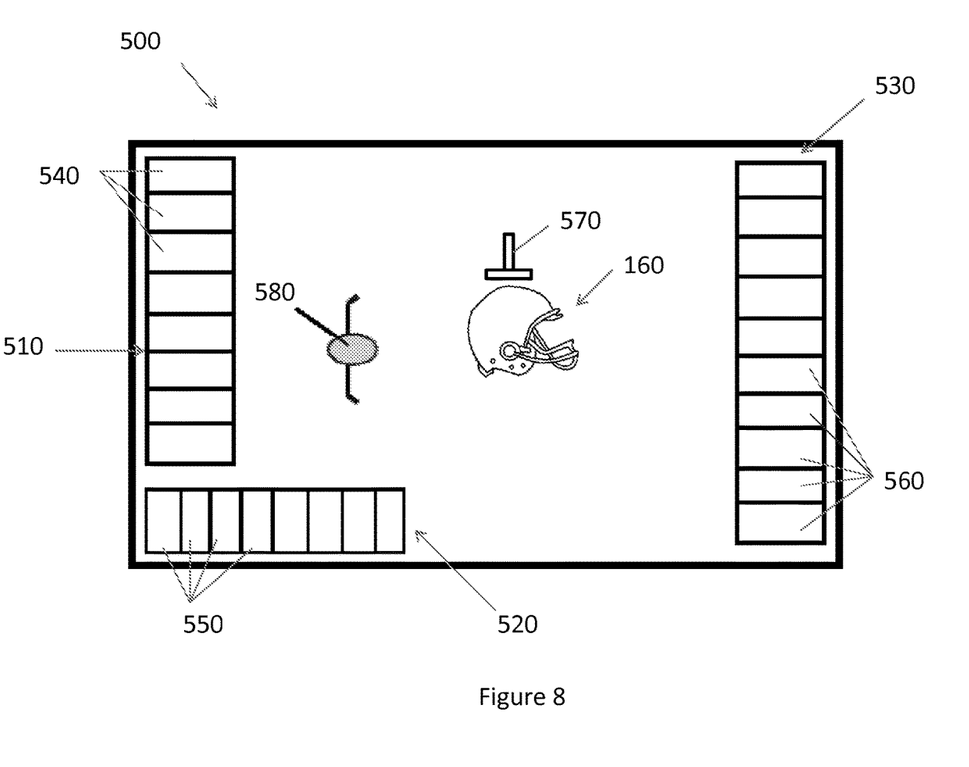
FIG. 8 is a of a top plan view of an exemplary embodiment of a customization process in accordance with the present invention.

FIG. 8 is an illustration of a top plan view of an exemplary assembly system in accordance with the present invention. In the present embodiment, a protective equipment item 160 may be placed in a fixture 570. It is notable that while the present figure illustrates the protective equipment item 160 as a helmet, as previously mentioned, any protective equipment item 160 is contemplated for any use and any body part. The fixture 570 may be any device configured to temporarily secure the protective equipment item 160 in position. The type of fixture 570 may be different for different types of protective equipment items 160, and any such fixture 570 is contemplated. The fixture 570 may be surrounded by a number of bins 510, 520, 530. Each bin 510, 520, 530 may comprise a number of compartments 540, 550, and 560. Each bin 510, 520, 530 may be limited to a particular pad 320, 330, 340, 350, 360, and 370. The particular pad 320, 330, 340, 350, 360, and 370 may be organized into the various compartments 540, 550, and 560 based on various sizes, types, styles, or the like. Thus each sizes, types, styles, or the like of each pad 320, 330, 340, 350, 360, and 370 is placed into the corresponding individual compartment 540, 550, and 560 of said bin 510, 520, 530. For example, without limitation, one of said bins 510 may be dedicated to forehead pads 340. The various compartments 540 may subdivide said bin 510 such that the first compartment contains a number of large forehead pads 340 of a first material, the second compartment contains a number of large forehead pads 340 of a second material, the third compartment contains a number of medium forehead pads 340 of the first material type, the fourth compartment contains a number of medium forehead pads 340 of the second material type, and so on. Any number of bins 510, 520, 530 having any number of compartments 540, 550, and 560 for any number or type of pads 320, 330, 340, 350, 360, and 370 are contemplated.

A robot 580 may receive instructions for the assembly of the protective equipment item 160 from the second computer 140 as best described in the discussion relating to FIG. 3 and FIG. 3A. In exemplary embodiments of the present invention, the robot 580 is an industrial type robot capable of grabbing and articulating small individual pieces, though any type of robot 580 is contemplated. The protective equipment item 160 may be placed in the fixture 570, and the robot 580 may travel from bin to bin 510, 520, and 530. At each bin 510, 520, and 530 the robot 580 may select the proper size, type, style, or the like, of a particular pad 320, 330, 340, 350, 360, and 370 from each compartment 540, 550, and 560 of the bin 510, 520, and 530. Thereafter, the robot 580 may take the pad 320, 330, 340, 350, 360, and 370 and secure it in the protective equipment item 160. This process may be repeated until all pads 320, 330, 340, 350, 360, and 370 are placed in the protective equipment item 160.

Figure 9:
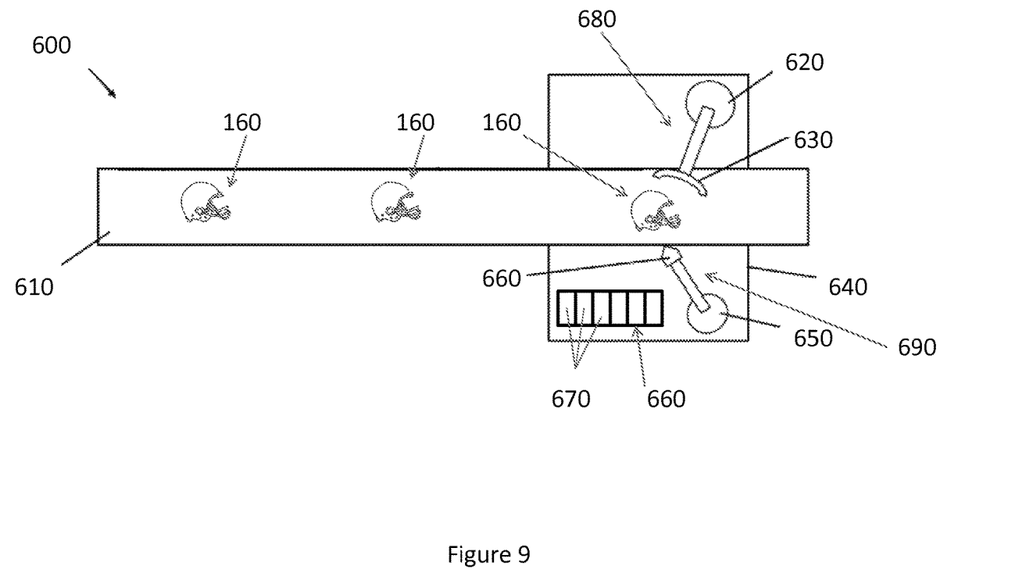
FIG. 9 is a of a top plan view of another exemplary embodiment of the customization process in accordance with the present invention.

FIG. 9 is an illustration of a top plan view of another exemplary assembly process in accordance with the present invention. Again, it is notable that while the present figure illustrates the protective equipment item 160 as a helmet, as previously mentioned, any protective equipment item 160 is contemplated for any use and any body part. A number of protective equipment items 160, may travel down an assembly line 610, such as by a conveyor belt. The assembly line 610 may pass through or terminate at an assembly area 640. The assembly area 640 may comprise a grabber robot 680 and an assembly robot 690. The grabber robot 680 and the assembly robot 690 may be pivotally mounted to a base section 620 and 650, respectively. In exemplary embodiments of the present invention, the grabber robot 680 and an assembly robot 690 are industrial type robots capable of grabbing and articulating small individual pieces, though any type of robots 680 and 690 are contemplated. The protective equipment item 160 may reach the grabber robot 580. The grabber robot 580 may utilize a grabbing fixture 630 to secure the protective equipment item 160. The assembly robot 690 may then select the correct custom insert pad combination, as instructed by the second computer 140. The placement robot 690 may select the proper combination of pads 320, 330, 340, 350, 360, and 370 from a bin 660 having a number of compartments 670 that subdivide said bin 660. The placement robot 690 may work with the grabber robot 680 to secure said pads 320, 330, 340, 350, 360, and 370 inside the protective equipment item 160. The assembly robot 690 may secure the pads 320, 330, 340, 350, 360, and 370 by use of adhesive, fasteners, or the like. Any number of bins 660 having any number of compartments 670 for any number of pads 320, 330, 340, 350, 360, and 370 are contemplated.

Figure 10:
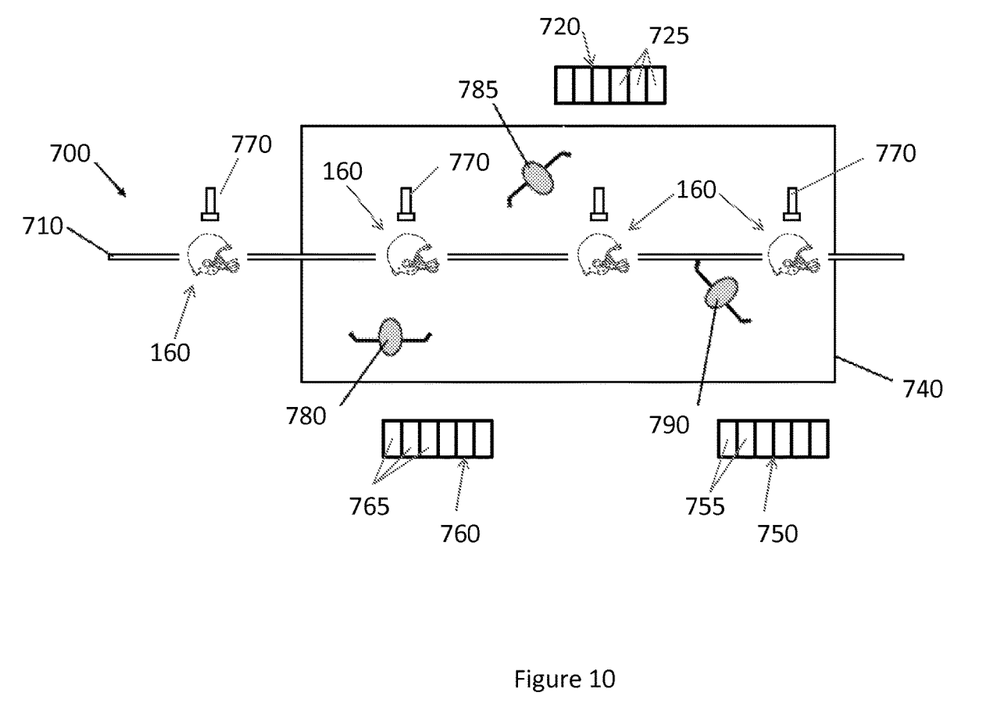
FIG. 10 illustrates a of a top plan view of another exemplary embodiment of the customization process in accordance with the present invention.

FIG. 10 is an illustration of a top plan view of another exemplary embodiment of an assembly process in accordance with the present invention. In such an embodiment, a protective equipment item 160 may travel down an assembly line 710, by use of a series of fixtures 770 that temporarily secure and transport the protective equipment item 160. In exemplary embodiments of the present invention the fixtures 770 are hangers, though any type of fixture is contemplated. As the protective equipment item 160 travels, it may encounter a number of robots 780, 785, and 790. The robots 780, 785, and 790 may select a predetermined insert pad 320, 330, 340, 350, 360, and 370 from one of a number of bins 720, 750, and 760 as instructed by the second computer 140. Each robot 780, 785, and 790 may grab a pad 320, 330, 340, 350, 360, and 370 from each bin 720, 750, and 760.

For example, the first robot 780 may be assigned to bin 760, and may select the proper forehead pad 340. The robot 785 may be assigned to bin 720, and may select the proper side head pad 350. Likewise, the robot 790 may be assigned to bin 750, and may select the proper top head pad 330. The robots 780, 785, and 790 may assemble the protective equipment item 160 as it travels. Alternatively, the protective equipment item 160 may temporarily stop at a station near each robot 780, 785, and 790 for a duration of time and the robot 780, 785, and 790 may work to assemble the protective equipment item 160, and then the assembly line 710 may continue to move the protective equipment item 160 to the next such station upon completion. Any number of robots 780, 785, and 790 are contemplated. Further, any number of bins 720, 750, and 760 having any number of compartments 725, 755, and 765 for any number of pads 320, 330, 340, 350, 360, and 370 are contemplated.

Any kind of automated industrial assembly process and related devices are contemplated. In other exemplary embodiments of the present invention, human workers may place each of the pads 320, 330, 340, 350, 360, and 370 manually.

Figure 11:
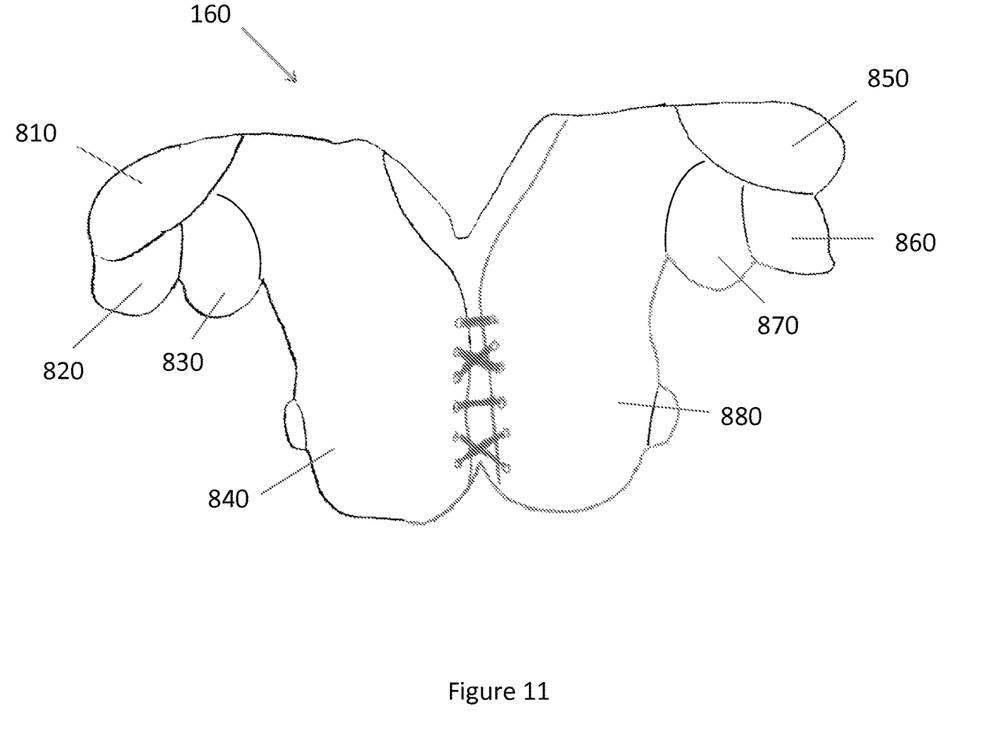
FIG. 11 illustrates a front view of another exemplary protective equipment item in the form of a shoulder pad, in accordance with an exemplary embodiment of the present invention.

FIG. 11 illustrates a front view of another exemplary protective equipment item 160 in the form of a shoulder pad. As previously discussed, the present example is merely exemplary and should not be understood to be limiting. Any number, style, or type of pads for any number of applications and activities is contemplated.

The shoulder pad may be comprised of a right and left upper shoulder guard 810 and 850. A left and right second shoulder guard 820 and 860 may be affixed below the left and right upper should guards 810 and 850, respectively. A right and left upper guard 830 and 870 may additionally be affixed to the shoulder pad and be configured to cover the front portion of the user's body. Right and left chest guards 840 and 880 may extend from the shoulder over the back and the chest of the user. The right and left halves of the shoulder pad may be joined at the front, back, and the sides by lace, belt, elastic band, or the like. Each of the guards 810, 850, 820, 860, 830, 870, 840, and 880 may be comprised of a rigid outer layer and a softer, flexible layer below.

Similar to previous examples a combination of standard sizes guards such as 810, 850, 820, 860, 830, 870, 840, and 880 may be utilized to provide a custom protective equipment item 160. For example, but not to serve as a limitation, the user may have one shoulder that is slightly larger than the other. A large right upper shoulder guard 850, second upper guard 860, upper guard 870, and chest guard 880 may be utilized with a medium left upper shoulder guard 810, second upper guard 820, upper guard 830, and chest guard 840. In another example, again without limitation, the user may have a weak or injured shoulder that requires extra padding, in which case, a larger size guard 810, 850, 820, 860, 830, 870, 840, and 880 or a guard material having a greater thickness or different protective properties may be utilized above the injured or weak shoulder.

Any embodiment of the present invention may include any of the optional or preferred features of the other embodiments of the present invention. The exemplary embodiments herein disclosed are not intended to be exhaustive or to unnecessarily limit the scope of the invention. The exemplary embodiments were chosen and described in order to explain the principles of the present invention so that others skilled in the art may practice the invention. Having shown and described exemplary embodiments of the present invention, those skilled in the art will realize that many variations and modifications may be made to the described invention. Many of those variations and modifications will provide the same result and fall within the spirit of the claimed invention. It is the intention, therefore, to limit the invention only as indicated by the scope of the claims.

What is claimed is:

1. A non-foot associated fitted protective article of equipment ("article of equipment") for a person manufactured by a process comprising:
   providing a plurality of fitting components of distinct types and in different predetermined sizes for each of the distinct types for creating a plurality of articles of equipment, including the article of equipment, with the fitting components;
   measuring a portion of the person using a measuring device for which the article of equipment is to protect;
   receiving, at a computer system, measurements from the measuring device;
   automatically identifying, at the computer system and by electronically and algorithmically comparing the measurements with data stored at the computer system, at least two of the distinct types of the fitting components in at least two of the different predetermined sizes for securement to a shell for the article of equipment in accordance with said measurements of said portion of said person such that other of said plurality of fitting components are not identified securement into the shell;
   automatically creating electronic instructions for assembly of the article of equipment comprising the identified types and sizes of the fitting components and locations for attachment of said fitting components at the shell;
   electronically transmitting said electronic instructions to one or more assembly machines; and
   assembling, by way of the one or more assembly machines, in an at least partially automated fashion, and in accordance with the electronic instructions, the fitted protective article of equipment comprising the identified types and sizes of the fitting components secured at the shell such that the other of said plurality of fitting components are not assembled in the article of equipment.

2. The article of equipment manufactured by the process of claim 1 wherein:
   the measuring device comprises a three-dimensional scanning device.

3. The article of equipment manufactured by the process of claim 2 wherein:
   the portion of the person comprises a medical device; and
   the fitted protective article of equipment is formed about the medical device.

4. The article of equipment manufactured by the process of claim 2 wherein:
   the portion of the person comprises an injured body part or area; and
   the fitted protective article of equipment is formed about the injured body part or area.

5. The article of equipment manufactured by the process of claim 2 wherein:
   the fitted protective article of equipment comprises a helmet and the fitting components are secured within said shell of said helmet, and the portion of the person to be measured comprises the head of said person.

6. The article of equipment manufactured by the process of claim 5 wherein:
   the helmet is a military helmet.

7. The article of equipment manufactured by the process of claim 1 wherein:
   the fitted protective article of equipment comprises one or more of: a helmet, a knee pad, an elbow pad, a chest protector, and a shoulder pad.

8. The article of equipment manufactured by the process of claim 1, wherein the process further comprises:
   sorting the fitting components into bins such based on at least type and size, wherein said one or more assembly machines comprise robots which pick individual ones of said fitting components from specific one or ones of said bins and place said picked fitting components into said shell in accordance with said electronic instructions; and
   moving the fitted protective article of equipment in various stages of manufacture along at least one conveyor device for assembly, wherein said at least one conveyor device extends along said bins and adjacent to said one or more assembly machines.

9. A system for creating a non-football associated fitted protective article of equipment ("article of equipment") for a person, said system comprising:
   a shell;
   a plurality of distinct types of fitting components, each adapted to be secured within the shell, and each provided in a plurality of distinct, predetermined sizes;
   a measuring device for measuring a portion of the person for which the article of equipment is to protect;
   one or more assembly machines configured to assemble, in an at least partially automated fashion, various embodiments of said article of equipment based, at least in part, on the types and sizes of the fitting components utilized; and
   at least one computer in electronic communication with said measuring device and said one or more assembly machines, said at least one computer comprising at least one electronic storage device comprising software instructions, which when executed, configure at least one processor to:
   receive and process the measurements;
   identify at least two of said distinct types of said fitting components in at least two different of said predetermined sizes for securement to said shell in accordance with said measurements of said portion of said person;
   create electronic instructions for assembly of the article of equipment comprising the identified types and sizes of the fitting components and locations for attachment of said fitting components at the shell; and
   transmit said electronic instructions to said one or more assembly machines for at least partially automated assembly of the article of equipment with the shell and the identified types and sizes of the fitting components.

10. The system of claim 9 wherein:
    the measuring device comprises a three-dimensional scanning device.

11. The system of claim 10 wherein:
    the portion of the person comprises a medical device or injured body area; and the fitting components are identified to accommodate the medical device or injured body area.

12. The system of claim 9 wherein:
    the article of equipment comprises a helmet;
    the fitting components are secured within said shell of said helmet; and
    the portion of the person to be measured comprises the head of said person.

13. The system of claim 9 further comprising:
    bins, each comprising the fitting components of a specific type and size, wherein said one or more assembly machines comprise robots capable of picking individual ones of said fitting components from specific one or ones of said bins and placing said picked fitting components into said shell in accordance with said electronic instructions; and at least one conveyor device for moving said articles of equipment in various stages of assembly along an assembly line comprising said bins and said one or more assembly machines.

14. A system for creating non-football associated fitted protective articles of athletic equipment ("article of athletic equipment") for a person, said system comprising:

shells of various type and size;

fitting components of various type and size, each adapted to be secured within a specific one of the various types of shells;

one or more three-dimensional scanning devices for measuring a portion of the person for which the article of athletic equipment is to protect;

one or more databases comprising one or more lookup tables associating each of the various types of shells with respective one or ones of the types of fitting components, location information for the fitting components, measurement ranges for the various sizes of the fitting components, and measurement ranges for the various sizes of the shells, wherein the measurement ranges are specific to the type of shell and the type of fitting component;

robotic assembly machines configured to assemble user-specific embodiments of said articles of athletic equipment varied, at least in part, on the type of shell, the size of shell, the type or types of fitting component, and the size or sizes of the fitting components utilized;

bins, each comprising the fitting components of a specific type and size, wherein each of the robotic assembly machines are configured for individual picking of said fitting components from individual one or ones of said bins and individual placement of said fitting components picked into said shell in accordance with electronic instructions;

one or more conveyor devices for moving said articles of athletic equipment in various stages of assembly along an assembly line comprising said bins and said robotic assembly machines; and one or more computers in electronic, networked communication with said one or more three-dimensional scanning device, said one or more databases, and said robotic assembly machines, said one or more computers comprising one or more electronic storage devices comprising software instructions, which when executed, configure one or more processors to:

receive the measurements from the one or more three-dimensional scanning devices;

identify, by comparing said measurements with the measurement ranges, at least one of said types of shell, at least one of said sizes of shell, at least two of said types of fitting components, and at least two of sizes of said fitting components for securement to said identified type and size shell in accordance with said measurements of said portion of said person;

creating, by consultation with the one or more lookup tables, said electronic instructions for assembly of the article of athletic equipment comprising the identified type and size of shell, the identified types and sizes of the fitting components, and locations information for each of said fitting components at the identified type and size of shell; and transmitting said electronic instructions to said robotic assembly machines for automated assembly of a specific one of the articles of athletic equipment in accordance with the electronic instructions for the person.

15. The system of claim 14 wherein:

the various types of shell comprise a helmet shell, knee pad shell, elbow shell, and shoulder pad shell.

16. The system of claim 15 wherein:

the various sizes comprise at least three, district, predetermined sizes.

17. The system of claim 16 wherein:

said at least one conveyor device comprises an attachment point for said shells of said various types; and the fitting components are secured within the shell by way of adhesive.

18. The system of claim 17 wherein:

the portion of the person comprises a medical device or an injured body part or area; and the specific one of the articles of athletic equipment is configured to accommodate the medical device or the injured body part or area.

* * * * *